(12) United States Patent
Schopf

(10) Patent No.: US 12,727,607 B2
(45) Date of Patent: Sep. 8, 2026

(54) UNCOATED DAIRY PRODUCT

(71) Applicant: General Mills, Inc., Minneapolis, MN (US)

(72) Inventor: Andreas Schopf, Lyons (FR)

(73) Assignee: General Mills, Inc., Minneapolis, MN (US)

( * ) Notice: Subject to any disclaimer, the term of this patent is extended or adjusted under 35 U.S.C. 154(b) by 1415 days.

(21) Appl. No.: 17/277,363

(22) PCT Filed: Oct. 1, 2018

(86) PCT No.: PCT/IB2018/001326
§ 371 (c)(1),
(2) Date: Mar. 18, 2021

(87) PCT Pub. No.: WO2020/070536
PCT Pub. Date: Apr. 9, 2020

(65) Prior Publication Data

US 2021/0352931 A1 Nov. 18, 2021

(51) Int. Cl.
*A23G 9/48* (2006.01)
*A23G 9/42* (2006.01)
*A23G 9/50* (2006.01)

(52) U.S. Cl.
CPC ................. *A23G 9/48* (2013.01); *A23G 9/42* (2013.01); *A23G 9/503* (2013.01); *A23V 2002/00* (2013.01)

(58) Field of Classification Search
CPC ............. A23G 9/48; A23G 9/42; A23G 9/503
See application file for complete search history.

(56) References Cited

U.S. PATENT DOCUMENTS 6,022,568 A 2/2000 Lesens et al.
6,379,724 B1 4/2002 Best et al.
6,890,576 B2 5/2005 Mehta et al.
8,021,706 B2 9/2011 Bartkowska et al.
2003/0152685 A1 8/2003 Baker
2010/0189865 A1* 7/2010 Sweet ...................... A23G 9/32 426/565
2011/0217425 A1 9/2011 Puaud et al.
2012/0328743 A1 12/2012 Head et al.
2013/0101702 A1 4/2013 Nalur
2013/0344227 A1* 12/2013 Quigley ............ A23C 19/0765 426/605
2015/0313257 A1 11/2015 Aldred et al.

FOREIGN PATENT DOCUMENTS

EP 1342418 9/2003
WO WO 2007/100321 9/2007

OTHER PUBLICATIONS

Pick Your Own, Pectin Levels in Fruits and Vegetables, [online], tables dated 1978 and 1979. Retrieved from the Internet: URL:<https://www.pickyourown.org/pectin_levels_in_fruit.php>.*

* cited by examiner

*Primary Examiner* — Viren A Thakur
*Assistant Examiner* — Chaim A Smith
(74) *Attorney, Agent, or Firm* — Jordan IP Law, LLC; Annette M. Frawley, Esq.

(57) ABSTRACT

Uncoated frozen dairy products and methods of making such uncoated frozen dairy products are disclosed herein. Uncoated frozen dairy products have an acidified surface layer, contain substantially no stabilizers or emulsifiers, are structurally unsupported, and exhibit a product loss of less than 30% over 60 minutes at a temperature of 25° C.

14 Claims, 2 Drawing Sheets

UNCOATED DAIRY PRODUCT

CROSS-REFERENCE TO RELATED APPLICATIONS

This application represents a National stage application of PCT/IB2018/001326, filed Oct. 1, 2018, entitled "Uncoated Dairy Product", pending. The entire content of this application is incorporated by reference.

BACKGROUND OF THE INVENTION

Consumers often seek novel eating experiences, especially with foods that are considered treats, such as ice cream. A trending eating experience with ice cream, and other frozen dairy products, includes portable eating experience, such as hand-held ice cream and stick bars (e.g., ice cream on a wooden or plastic stick). In many cases, complex ingredient combinations can provide sufficient stability to a frozen dairy product to allow for consumers to enjoy portable frozen dairy products. However, there is a need for portable frozen dairy product options with more simple ingredients.

SUMMARY

Provided herein is an uncoated frozen dairy product. An uncoated frozen dairy product provided herein has a product loss of less than 30% over 60 minutes at a temperature of 25° C., is structurally unsupported, has an acidified surface layer, and contains substantially no stabilizers or emulsifiers.

In some embodiments an uncoated frozen dairy product can have a product loss of less than 30% over 80 minutes at a temperature of 25° C.

In some embodiments, the acidified surface layer of an uncoated frozen dairy product includes a fruit juice containing an organic acid.

In some embodiments, a frozen dairy product provided herein can be an ice cream.

In some embodiments, a frozen dairy product provided herein can be a stick bar product.

Also provided herein is a method of making an uncoated frozen dairy product having a product loss of less than 30% over 60 minutes at a temperature of 25° C. A method provided herein includes applying an organic acid solution having a pH of less than 2.7 to the surface of a frozen dairy mass containing substantially no stabilizers or emulsifiers to make the uncoated frozen dairy product, wherein the uncoated frozen dairy product is structurally unsupported.

In some embodiments, an organic acid solution used in a method provided herein can have a pH of 2.6 or less. In some embodiments, an organic acid solution used in a method provided herein can have a pH of 2.3 or less.

In some embodiments of a method provided herein, the organic acid solution can include lemon juice.

In some embodiments of a method provided herein, applying the organic acid solution can include dipping the frozen dairy mass into the organic acid solution. In some embodiments of a method provided herein, applying the organic acid solution can include spraying the organic acid solution on the surface of the frozen dairy mass.

In some embodiments of a method provided herein, the method can further include subjecting the frozen dairy product to a temperature of 0° C. or less.

In some embodiments of a method provided herein, the method can further include packaging the frozen dairy product.

In some embodiments of a method provided herein, the frozen dairy mass can be an ice cream.

In some embodiments of a method provided herein, the frozen dairy mass can be a stick bar product.

Additional objects, features and advantages of the invention will become more readily apparent from the following detailed description when taken in conjunction with the drawings wherein like reference numerals refer to corresponding parts in the several views.

DETAILED DESCRIPTION

Figure 1:
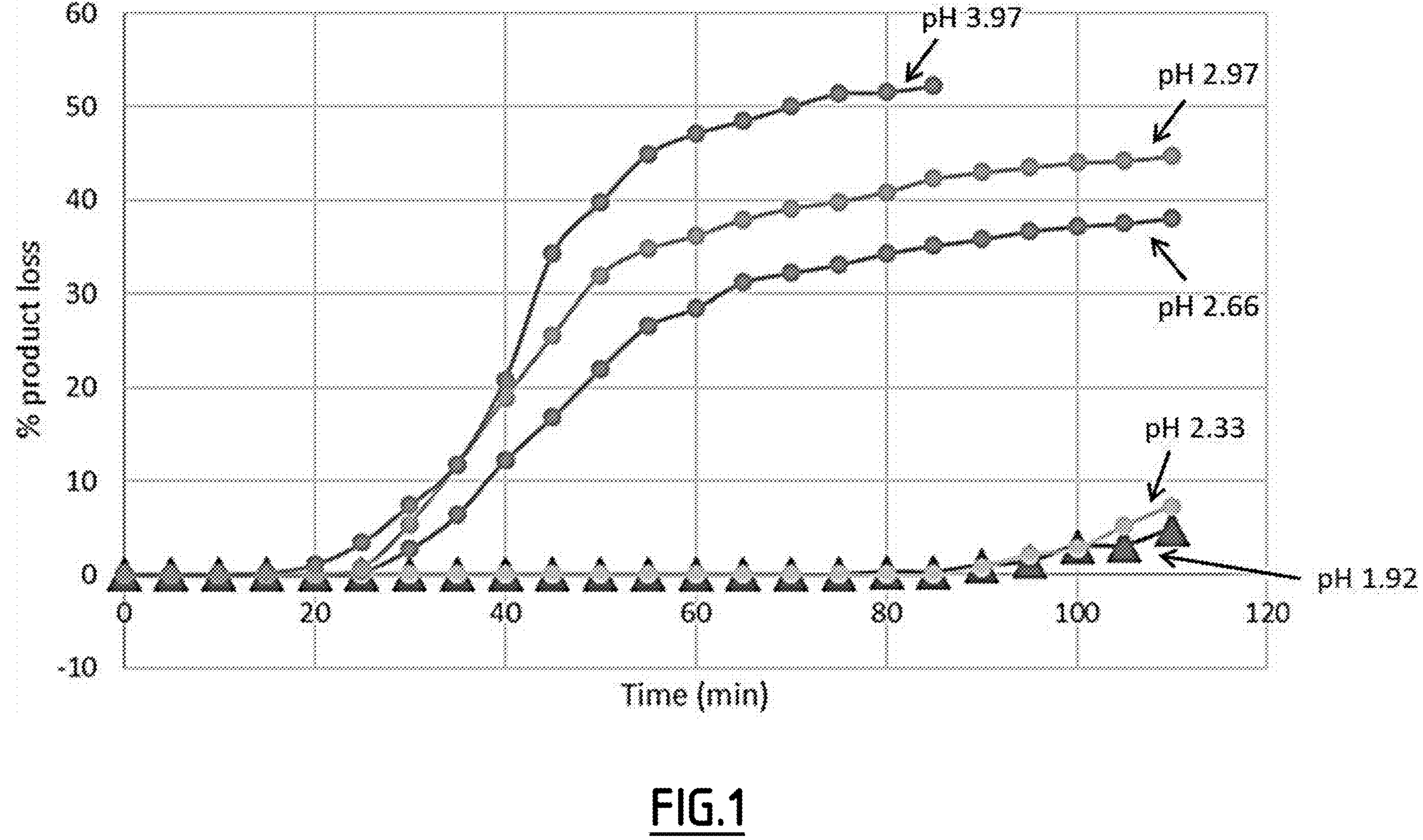
FIG. 1 is a graph comparing product loss rates of an uncoated frozen dairy product made by dipping frozen dairy masses in organic acid solutions at varying pH levels.

Consumers are increasingly looking for foods that provide enjoyable eating experiences with simpler ingredients. Ingredients that consumers are more likely to avoid include stabilizers and emulsifiers. However, stabilizers and emulsifiers can provide structural and textural advantages to foods, and can be used to make portable frozen dairy products, such as ice cream (e.g., traditional and soft serve ice cream), frozen custard, frozen fudge, frozen mousse, ice milk, sherbet, and frozen yogurt, that are relatively stable at elevated temperatures. One way to achieve a portable frozen dairy product without relying on stabilizers or emulsifiers is to coat a frozen dairy portion in a fat-based or confectionary coating, such as a chocolate coating. However, some consumers would prefer to avoid the added fat of a coating, or avoid the flavor or texture of a coating.

It was discovered, and is described herein, that an organic acid can be applied to the surface of a frozen dairy mass that contains substantially no stabilizers or emulsifiers to achieve a unique uncoated, structurally unsupported frozen dairy product that has reduced product loss at elevated temperatures. As used herein, a frozen dairy product having "substantially no stabilizers or emulsifiers" refers to a frozen dairy product that contains no added ingredients that contribute to structural stability, other than milk ingredients (e.g., whole milk, low fat milk, skim milk, cream, or the like), natural sweeteners (e.g., sucrose, honey, maple syrup, *stevia* extract, and the like), egg ingredients (e.g., whole egg, egg white, or egg yolk), fruit ingredients (e.g., fruit puree, fruit pieces, fruit juices, and the like), natural flavors (e.g., vanilla bean, vanilla extract, cocoa, and the like), inclusions (e.g., nut or nut pieces, chocolate pieces, or the like), or organic acids as described below.

In addition to avoiding stabilizers and emulsifiers, as well as fat-based coatings, this discovery provides a unique aspect of providing the consumer a product that displays the frozen dairy product as uncoated and structurally unsupported. As used herein, the term "uncoated" refers to a frozen dairy product that does not have a fat-based or confectionary coating. As used herein, the term "structurally unsupported" refers to a frozen dairy product that substantially retains its shape in the absence of an exterior packaging or other external support structure other than an acidified surface layer. It is to be understood that a frozen dairy product provided herein can include an internal structure, such as a stick, while remaining structurally unsupported as defined herein. In addition, it is to be understood that a structurally unsupported frozen dairy product can be packaged for ease of transportation, sale, and for food safety purposes. However, a structurally unsupported frozen dairy product substantially retains its shape after being removed from any packaging.

The invention relates generally to an uncoated portable frozen dairy product containing substantially no stabilizers or emulsifiers. An uncoated portable frozen dairy product can be in any form, such as a stick bar (e.g., frozen dairy product on a stick), a frozen dairy bar, a frozen dairy cake, a frozen dairy sandwich, a frozen dairy bite, frozen dairy in a cone, and the like.

An uncoated frozen dairy product provided herein includes an acidified surface layer that contributes to a reduction in product loss at elevated temperatures. An uncoated frozen dairy product provided herein has a product loss of less than 30% (e.g., less than 25%, or less than 20%) over 60 minutes at a temperature of 25° C. In some embodiments, an uncoated frozen dairy product can have a product loss of less than 30% over more than 60 minutes (e.g., at least 90 minutes, or at least 120 minutes) at 25° C. As used herein, product loss is measured by placing an uncoated frozen dairy product mass having a known weight (e.g., from about 10 g to about 150 g, from about 15 g to about 100 g, or from about 50 g to about 80 g) on a #2 mesh size sieve placed over a container and held at 25° C. At one or more selected time point (e.g., 60 minutes, 75 minutes, 90 minutes, or the like), the weight of uncoated frozen dairy product mass that flows away from the original uncoated frozen dairy product mass is measured in the container under the sieve. The amount of uncoated frozen dairy product mass that flows away as a percentage by weight of the original weight of the uncoated frozen dairy product mass is the product loss.

An acidified surface layer is formed by applying an organic acid solution to a surface of a frozen dairy product mass to produce an uncoated frozen dairy product provided herein. An organic acid solution suitable for applying to a frozen dairy product mass has a pH of 2.7 or less (e.g., less than 2.7, 2.6 or less, or 2.3 or less). Any organic acid is suitable for use in making an uncoated frozen dairy product provided herein. For example, fruit juices (e.g., lemon juice, cranberry juice, or the like), vinegars (e.g., apple cider vinegar, balsamic vinegar, or the like), or other solutions of organic acids (e.g., citric acid, acetic acid, malic acid, lactic acid, or the like), or any combination thereof, can be used.

An organic acid solution can be applied to a surface of a frozen dairy product mass using any appropriate method, such as spraying or dipping the frozen ice cream mass. For example, a frozen dairy product mass on a stick can be dipped in a lemon juice to achieve an acidified layer on a surface. An organic acid solution applied to a frozen dairy product mass can have a temperature of from about 20° C. to about 40° C. (e.g., from about 25° C. to about 30° C.).

A frozen dairy product mass can have a temperature of −20° C. or less (e.g., from −20° C. to −50° C.) at the time an organic acid solution is applied to a surface. A frozen dairy product can have any appropriate mass and volume. In some embodiments frozen dairy product mass can have a weight of from about 10 g to about 200 g. For example, a frozen dairy bar can have a weight of from about 30 g to about 80 g, or bite sized frozen dairy pieces can have a weight of from about 10 g to about 25 g, or a frozen dairy cake can weigh from about 100 g to about 200 g. In some embodiments, a frozen dairy product can have a volume of from about 10 ml to about 150 ml. For example, a stick bar can have a volume of around 70 to 80 ml, while frozen dairy bites can have a volume of about 10 ml to about 15 ml.

Without being bound to theory, it is believed that an organic acid causes denaturation of milk proteins on the surface of a frozen dairy product mass to achieve a layer on the surface that can prevent inner, non-acidified portions of the ice cream from flowing off of the ice cream mass. Non-organic acids, such as hydrochloric acid, even at the same pH, do not achieve this effect. Without being bound by theory, it is believed that the slower reaction kinetics of organic acids can achieve a protective surface layer on ice cream because the organic acid can penetrate the surface sufficiently before denaturing milk proteins such that a thicker layer of denatured proteins is formed. In contrast, it is believed that inorganic acids, such as hydrochloric acid may denature proteins so quickly that further penetration of the acid is prevented by a thin layer of denatured proteins, which is not thick enough to protect an ice cream mass (e.g., at least 0.5 mm, at least 0.7 mm, or at least 1 mm).

In some embodiments, following application of an organic acid solution, an uncoated frozen dairy product can be subjected to a temperature of 0° C. or less (e.g., less than −20° C., −30° C. or less, or −40° C. or less). In some embodiments, an uncoated frozen dairy product can be packaged in any suitable packaging. Although an uncoated frozen dairy product provided herein has reduced product loss at elevated temperatures, it is preferred that the product be stored a temperature of less than 4° C. (e.g., 0° C. or less). However, it is to be understood that storage, shipping, and handling temperatures need not be ideal, so an uncoated frozen dairy product provided herein may be subjected to temperatures at or above 4° C.

Frozen dairy products suitable for use as a frozen dairy product mass in methods provided herein to produce an uncoated frozen dairy product can include frozen dairy products with simple ingredient combinations, without measurable amounts of stabilizers or emulsifiers, as defined herein.

EXAMPLES

Example 1

Figure 2:
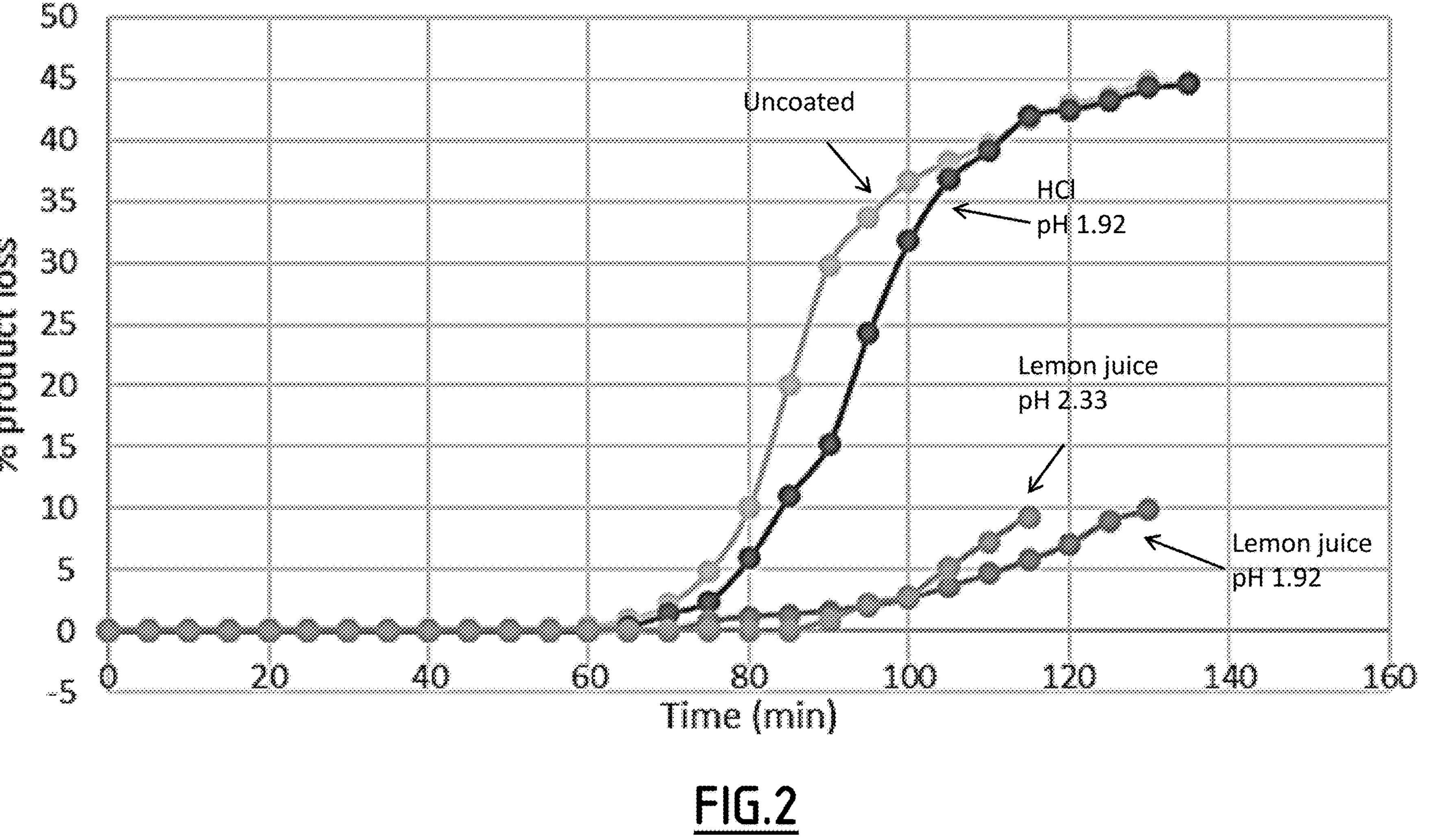
FIG. 2 is a graph comparing product loss rates of an uncoated frozen dairy product made by dipping frozen dairy masses in organic acid solutions at two pH levels to product loss rates of an uncoated frozen dairy product made by dipping frozen dairy masses in an inorganic acid solution (HCl).

An ice cream product was produced with milk, cream, egg, sugar, and vanilla extract, and frozen in molds to produce frozen dairy masses having a weight of about 70 g each. The ice cream masses were either left untreated, dipped in water, dipped in a hydrochloric acid (HCl) solution (pH 1.92), or dipped in a lemon juice solution (pH 1.92, pH 2.33, pH 2.66, pH 2.97, or pH 3.97). Each ice cream product was at a temperature of about −40° C. prior to dipping, and each dipping treatment was at a temperature of about 25° C. to about 30° C. After dipping, the treated masses were stored at −23° C. for 3 days prior to measuring product loss. Product loss was measured as described above. Dipping in water yielded similar results as leaving the ice cream product uncoated. FIG. 1 shows product loss over time for each of the masses treated with lemon juice. As can be seen in FIG. 1, masses treated with lemon juice at a pH below 2.7 had a distinctly improved product loss profile. As can be seen in FIG. 2, where lemon juice treatment is compared to HCl treatment and water treatment, organic acid provides an improved product loss profile over HCl.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making an uncoated frozen dairy product, the method comprising applying an organic acid solution having a pH of less than 2.7 to the surface of a frozen dairy mass to make the uncoated frozen dairy product, wherein the uncoated frozen dairy product contains substantially no stabilizers or emulsifiers, is structurally unsupported and has a product loss of less than 30% over 60 minutes at a temperature of 25° C.

2. The method of claim 1, wherein the organic acid solution has a pH of 2.6 or less.

3. The method of claim 1, wherein the organic acid solution has a pH of 2.3 or less.

4. The method of claim 1, wherein the organic acid solution comprises lemon juice.

5. The method of claim 1, wherein applying the organic acid solution comprises dipping the frozen dairy mass into the organic acid solution.

6. The method of claim 1, wherein applying the organic acid solution comprises spraying the organic acid solution on the surface of the frozen dairy mass.

7. The method of claim 1, further comprising subjecting the frozen dairy product to a temperature of 0° C. or less.

8. The method of claim 1, further comprising packaging the frozen dairy product.

9. The method of claim 1, wherein the frozen dairy mass is ice cream.

10. The method of claim 1, wherein the frozen dairy product is a stick bar product.

11. A method of making an uncoated frozen dairy product, the method comprising applying an organic acid solution having a pH of less than 2.7 to the surface of a frozen dairy mass to form an acidified surface layer and make the uncoated frozen dairy product, wherein the uncoated frozen dairy product: is uncoated such that the method is carried out without adding a fat-based or confectionary coating; contains substantially no stabilizers or emulsifiers such that the method is carried out without adding any stabilizers or emulsifiers to the frozen dairy product; is structurally unsupported such that the method is carried out without retaining the shape of the uncoated frozen dairy product using an external support structure other than the acidified surface layer; and has a product loss of less than 30% over 60 minutes at a temperature of 25° C.

12. The method of claim 11, wherein the organic acid solution is fruit juice or vinegar.

13. The method of claim 12, wherein the organic acid solution is fruit juice.

14. The method of claim 12, wherein the organic acid solution is vinegar.

* * * * *